United States Patent [19]
Yagi et al.

[11] Patent Number: 5,107,802
[45] Date of Patent: Apr. 28, 1992

[54] VALVE DRIVING MECHANISM FOR INTERNAL COMBUSTION ENGINES

[75] Inventors: Shizuo Yagi, Asaka; Shoichi Honda, Tokyo; Takashi Inagaki, Kawagoe; Youichi Ishibashi, Tokorozawa; Kenji Nishida, Shiki, all of Japan

[73] Assignee: Honda Giken Kogyo Kabushiki Kaisha, Tokyo, Japan

[21] Appl. No.: 705,274

[22] Filed: May 24, 1991

[30] Foreign Application Priority Data

May 28, 1990 [JP] Japan .................................. 2-137889
Oct. 8, 1990 [JP] Japan .................................. 2-269984

[51] Int. Cl.⁵ .................................................. F01L 1/34
[52] U.S. Cl. ................................ 123/90.15; 123/90.31
[58] Field of Search ............... 123/90.15, 90.16, 90.31, 123/90.41

[56] References Cited

U.S. PATENT DOCUMENTS 4,580,533  4/1986  Oda et al. ........................ 123/90.16
4,582,029  4/1986  Masuda et al. ................... 123/90.16
4,651,684  3/1987  Masuda et al. ................... 123/90.16

FOREIGN PATENT DOCUMENTS 2231088 11/1990 United Kingdom ............. 123/90.15

Primary Examiner—E. Rollins Cross
Assistant Examiner—Weilun Lo
Attorney, Agent, or Firm—Lyon & Lyon

[57] ABSTRACT

A valve drive system including mechanisms for varying the timing and lift of intake and exhaust valves in internal combustion engines. In one embodiment, an intake camshaft support member and an exhaust camshaft support member are separately mounted to pivot about axes relative to intake and exhaust rocker arms. The support members include concentric mountings along which the support members together with the cams mounted therein move to selectively advance and retard the valve timing and vary the valve lift. In other embodiments, the camshaft support is unitary in construction for both the intake and exhaust valve train. A variety of adjustments are possible with the several configurations including intake valve closure before bottom dead center during partial load operation.

6 Claims, 21 Drawing Sheets

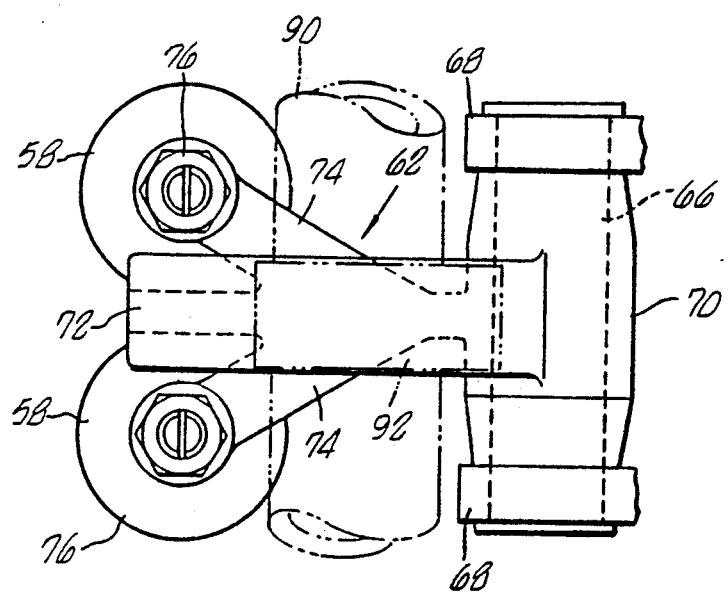
FIG_4.

FIG_2

VALVE DRIVING MECHANISM FOR INTERNAL COMBUSTION ENGINES

BACKGROUND OF THE INVENTION

The field of the present invention is internal combustion engine valve driving mechanisms capable of varying timing and lift.

Valve timing and valve lift of intake and exhaust valves in a four cycle internal combustion engine are important factors on which the performance of internal combustion engines depend. Mechanisms have been devised to accomplish variations in valve timing and lift during operation of the engine according to measured states of the engine. Camshaft support devices are known which are pivotally mounted within the engine. A camshaft is then rotatably mounted within the support device and engages appropriate rocker arms. Through a pivoting of the camshaft support device, the cam is moved relative to the rocker arm such that the cam operates on selected portions of the rocker arm surface. Depending on the direction of relative movement between the camshaft support device and the rocker arm, and the configuration of the rocker arm surface, the timing of valve opening and valve closing, and the valve lift may be controlled.

By controlling the profile of valve operation, it is possible to obtain improved intake inertia effects for increased volumetric efficiency. Pulsation effects of the exhaust system may also be utilized for improved performance through valve timing. The volume of fresh air passing through the engine may also be controlled when appropriate as well as the back flow of the exhaust pressure into the intake system.

SUMMARY OF THE INVENTION

The present invention is directed to a valve driving system having a camshaft support mechanism for the intake valve train and a camshaft support mechanism for the exhaust valve train which are each movable relative to the respective rocker arms so as to selectively provide variation in valve timing and in valve lift. Through such a system, substantial flexibility may be realized in providing variation in lift and timing of the valves.

In a first aspect of the present invention, an intake camshaft support mechanism and an exhaust camshaft support mechanism are independently movably mounted in an internal combustion engine. Each mechanism is controllable to move in an arc relative to associated intake and exhaust rocker arms. Independent mounting of the camshaft support members provides greater freedom and ability for independent variations in timing and lift.

In a second aspect of the present invention, guideways are provided within which the camshaft support members are located. These guideways assure proper structural retention of the camshafts and accurate positioning thereof. Guideways are located to either side of the associated camshaft support member and define concentric arcs to provide an effective pivot axis about which the camshaft is to move.

In a further aspect of the present invention, the valve driving system is arranged to have the intake valve close before the piston reaches bottom dead center on the intake stroke. In this way, the amount of fresh air drawn into the engine is controlled. With this control, it is possible to control the output torque of the internal combustion engine while maintaining the throttle valve in a relatively open position during partial load operation. As a result, on the intake stroke, the passage resistance of the fresh air passing through the throttle valve decreases, resulting in decreased pumping loss.

Other and further objects and advantages will appear hereinafter.

BRIEF DESCRIPTION OF THE DRAWINGS

FIG. 4 is an enlarged prospective view taken along line 4—4 of FIG. 2.

FIG. 17 is a sectional end view of a valve driving mechanism of a fourth embodiment.

DETAILED DESCRIPTION OF THE PREFERRED EMBODIMENT

Figure 1:
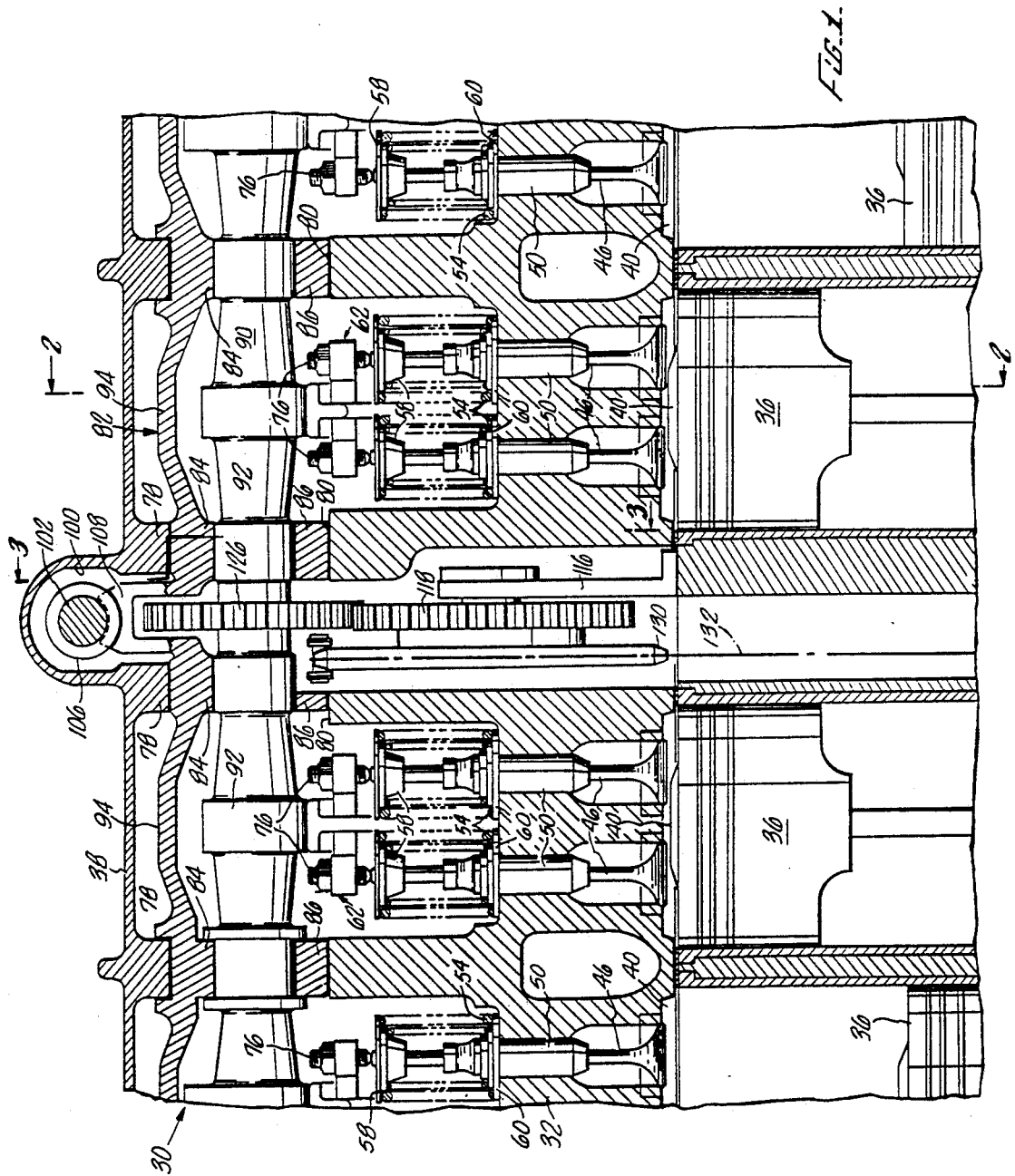
FIG. 1 is a longitudinal sectional view taken along line 1—1 of FIG. 2 of an internal combustion engine provided with a valve driving mechanism.

Turning in detail to the drawings, a double overhead camshaft type four cycle multiple cylinder internal combustion engine 30 has a cylinder head 32 joined to the upper part of a cylinder block 34 in which a piston 36 slides. A cylinder head cover 38 is joined to the upper section thereof. A combustion chamber 40 is formed in the cylinder head 32 opposite to the head of the piston 36. Intake valves 46 and exhaust valves 48 are arranged in a pair of intake ports 42 and a pair of exhaust ports 44 which open to the combustion chamber 40. The intake valves 46 and the exhaust valves 48 are slidably supported by valve guides 50 and 52, respectively. The valves are biased upwardly by valve springs 54 and 56 compressed between upper and lower retainers 58 and 60 which seat the valve heads to the valve seats. Both the valves 46 and 48 are driven through contact of the upper end of their stems with intake rocker arm 62 and exhaust rocker arm 64, respectively.

As can be seen from FIG. 4, the intake rocker arm 62 is pivotally supported on an intake rocker arm shaft 66 installed on the cylinder head 32 through a pair of brackets 68. The intake rocker arm 62 is supported on the outer periphery of the intake rocker arm shaft 66 through a boss section 70. The intake rocker arm 62 has a circular slipper surface 72 on top thereof. Also on the top surface of the rocker arm 62 is a pair of valve driving sections 74 extending in the lateral direction toward a pair of adjusting screws 76 used to adjust valve clearance.

Figure 2:
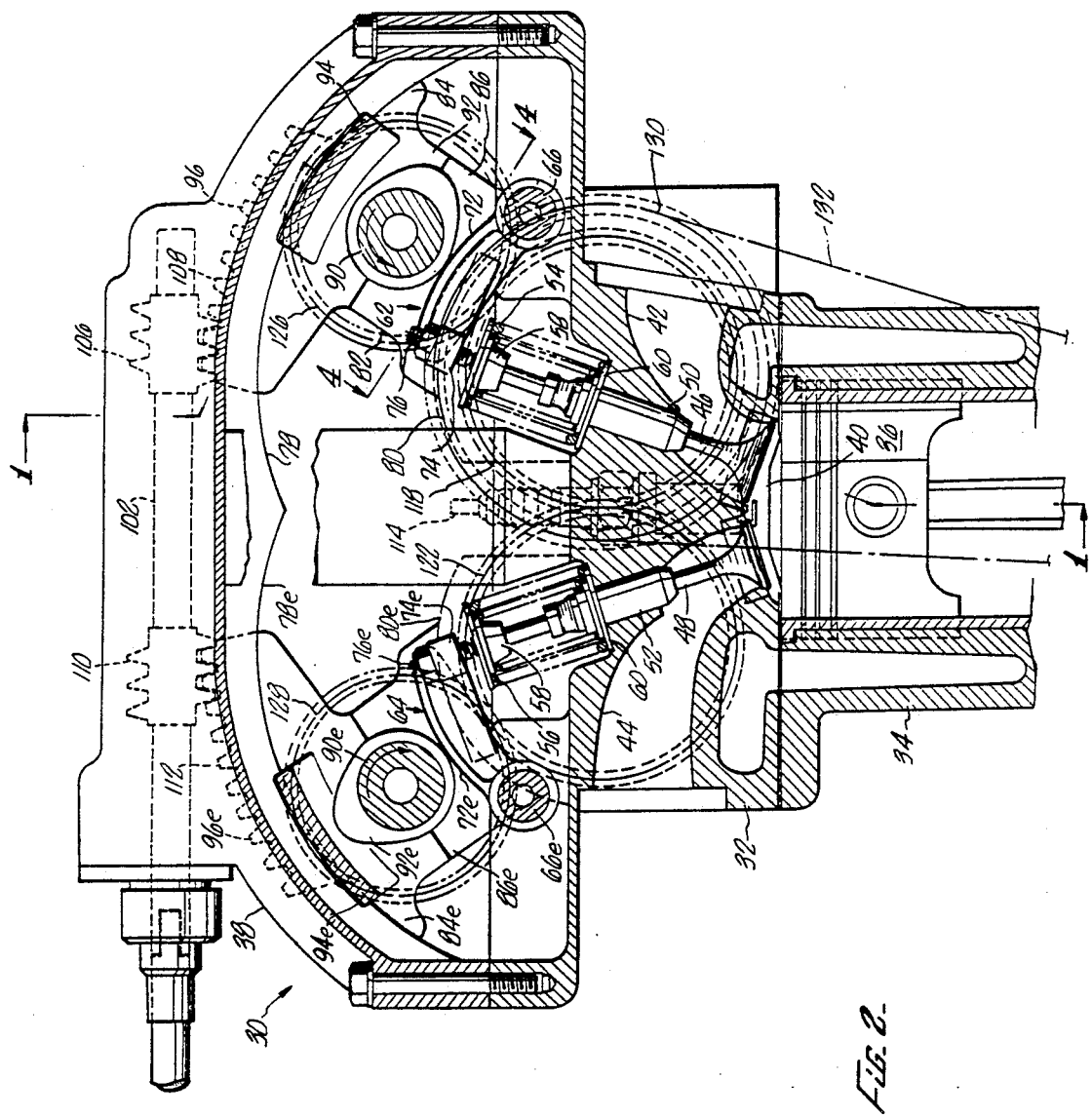
FIG. 2 is a sectional view taken along line 2—2 of FIG. 1.
Figure 3:
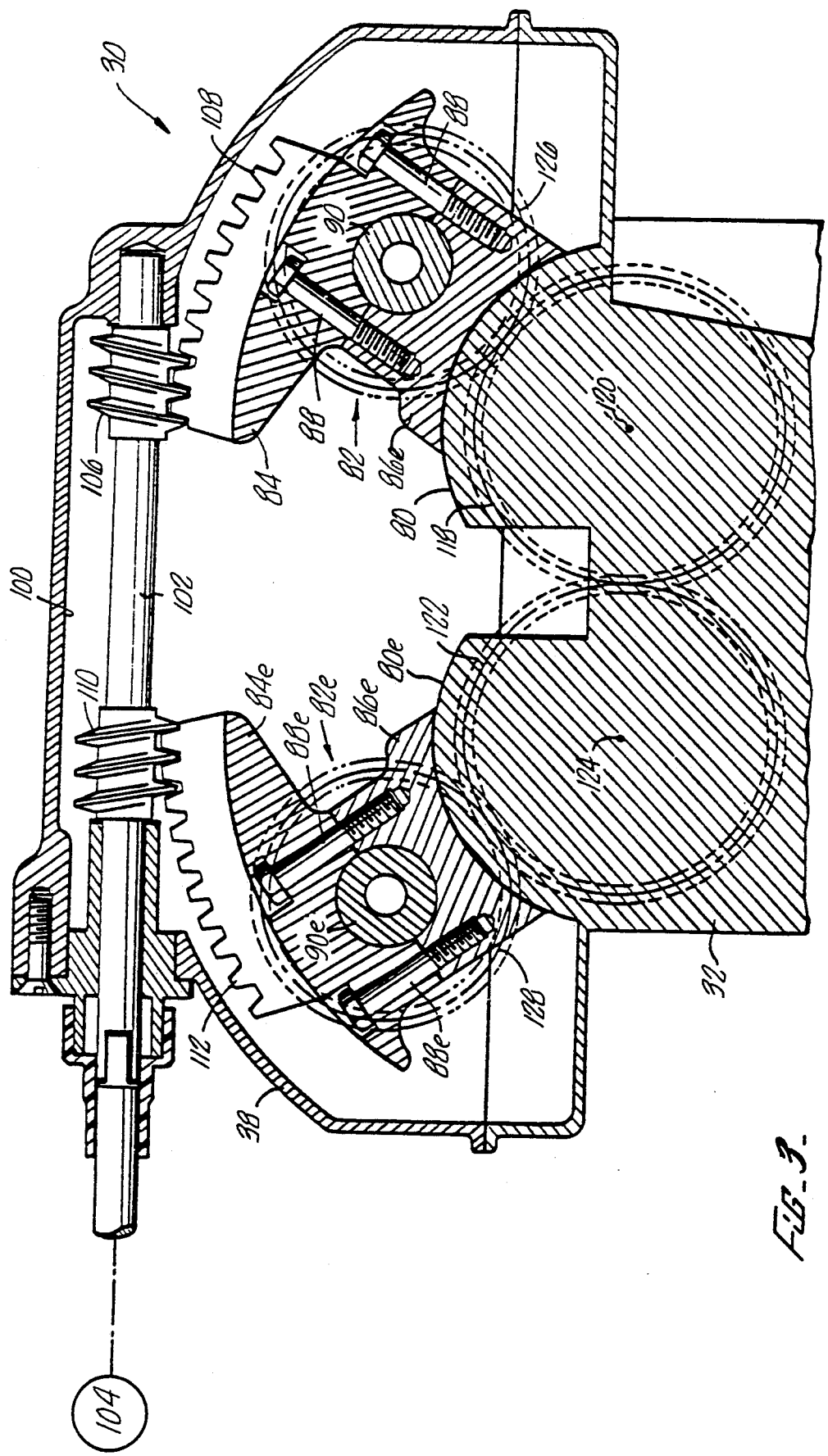
FIG. 3 is a sectional view taken along line 3—3 of FIG. 1.

Referring specifically to FIGS. 1 through 3, a plurality of circular guide rails 78 are formed on the upper inner surface of the cylinder head cover 38. Also a plurality of circular guide surfaces 80 are formed on the upper surface of the cylinder head 32 opposed to the guide rails 78 at a fixed distance. An intake camshaft support member 82 is provided with a plurality of upper side plates 84 which are slidably guided by the guide rail 78 and a plurality of lower side plates 86 which are guided by the guide surfaces 80. Both the side plates 84 and 86 are connected by two bolts 88 in order to rotatably hold an intake camshaft 90. The camshaft 90 has a cam 92 which is in contact with the slipper surface 72 of the rocker arm 62. The adjacent upper side plates 84 are connected to one body by a connecting member 94 so that they may move as one unit and are connected at the center through a sector gear 96. The exhaust rocker arm 64 and the exhaust camshaft support member 98 are of the same symmetrical construction as the aforementioned intake rocker arm 62 and the intake camshaft support member 82 as seen in FIGS. 2 and 3. Therefore, to avoid redundancy explanation of these exhaust valve train components will be avoided by using the same numerals with a postscript "e" to avoid redundancy.

In a recess 100 of the head cover, a worm gear shaft 102 is rotatably supported. The worm gear shaft 102 is coupled with a servomotor 104. A worm gear 106 is formed on the forward end of the worm gear shaft 102 and is meshed with a sector gear 108. The sector gear 108 is part of the intake shaft support member 82. A worm gear 110 also formed on the worm gear shaft 102 is meshed with a sector gear 112 of the exhaust camshaft support member 98. Because the worm gear 106 and the worm gear 110 are formed as reversed gears, the intake camshaft support member 82 and the exhaust camshaft support member 98 are driven to move mutually toward or away from each other through a driving of the worm gear shaft 102. A spark plug 114 is positioned within the cylinder head 32 between the camshaft support members 82 and 98 in a desirable position at the center of the combustion chamber 40, as best seen in FIG. 2.

An idler gear 118 is axially mounted to a bracket 116 on the top surface of the cylinder block 34 such that the axis of the gear 118 will coincide with the circle arc center 120 of the guide rail 78 which guides the intake camshaft support member 82 and the guide surface 80. Also on the bracket 116 is axially supported an idler gear 122 having the same number of teeth as the idler gear 118 such that its axis will coincide with the circle arc center 124 of the guide rail 78e which guide the exhaust camshaft support member 98 and the guide surface 80e.

The slipper surface 72 of the intake rocker arm 62 has a circular arm surface with the axial center 120 of rotation of the intake idler gear 118. Similarly, the slipper surface 62e of the exhaust rocker arm 64 has a circular arc surface with the axial center 124 of rotation of the exhaust idler gear 122. Both the camshaft support members 82 and 98, being pivotally supported on the axial center of rocking 120 and 124, respectively, can be designed and made smaller in size than were these components integral and the radii of curvature of the slipper surfaces 72 and 72e also may become smaller.

The intake idler gear 118 is engaged with an intake cam gear 126 installed on the intake camshaft 90. The exhaust idler gear 122 is engaged with an exhaust cam gear 128 mounted on the exhaust camshaft 90e. These idler gears 118 and 122 are in mesh with each other. A sprocket 130 is formed integrally with the intake idler gear 118 which is connected to a crankshaft through a chain 132. Therefore, the rotation of the crankshaft is transmitted to the intake cam gear 126 through the chain 132, the sprocket 130, and the idler gear 118. At the same time, cam drive is directed from the idler gear 118 to the exhaust cam gear 128 through the idler gear 122, thus turning the intake camshaft 90 and the exhaust camshaft 90e in the reverse directions at a one-half speed of the crankshaft.

Looking to the operation of the device of FIGS. 1 through 4, with operation of the internal combustion engine 30, the rotation of the idler gear 118 connected with the crankshaft through the chain 132 is transmitted to the camshaft 90 at one-half the crankshaft speed. The rotation of the idler gear 118 is transmitted to the camshaft 90e through the idler gear 122 and the cam gear 128. The camshaft 90e is thus driven at the same speed of rotation and in the reverse direction as the camshaft 90. The rocker arms 62 and 64 are in contact with the cams 92 and 92e rotating together with the camshafts 90 and 90e. The rocker arms 62 and 64 are driven to rock on the rocker arm shafts 66 and 66e resulting in the intake valves 46 and exhaust valves 48 being pushed down by the rocker arms 62 and 64 at a rate of once per every two revolutions of the crankshaft. The intake cam 92 rotates counterclockwise as seen in FIG. 1 while the exhaust cam 92e turns clockwise. Since the exhaust cam 92e is advanced in phase by about 90° more than the intake cam 92, the exhaust valve 48 first starts to open and then the intake valve 46 starts to open in succession. The valve timing of the exhaust valve 48 slightly overlaps that of the intake valve 46 forming a valve overlap period of these valves.

Figure 5A:
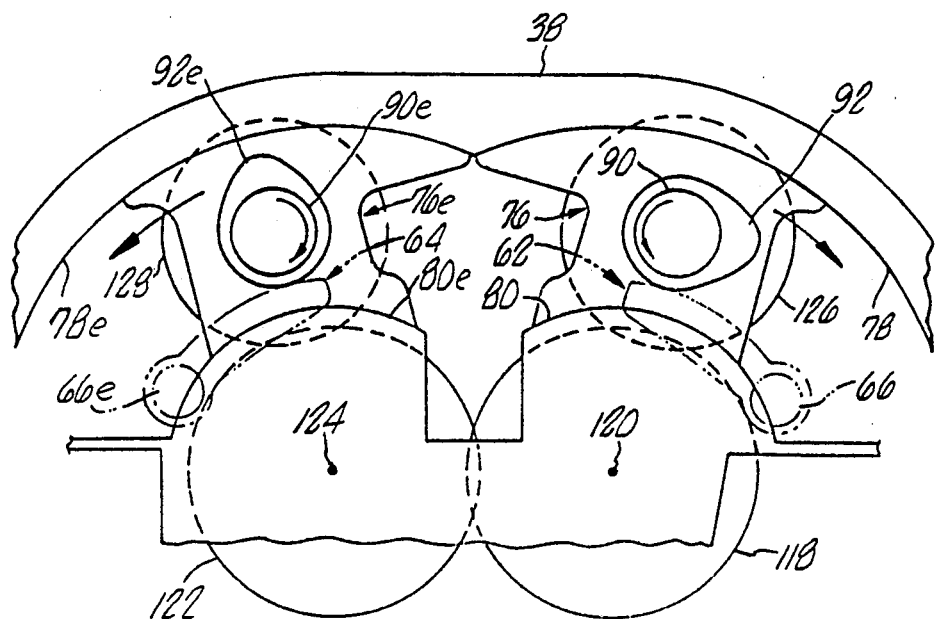
FIGS. 5a and b are explanatory views illustrating the operation of the valve driving mechanism.
Figure 6:
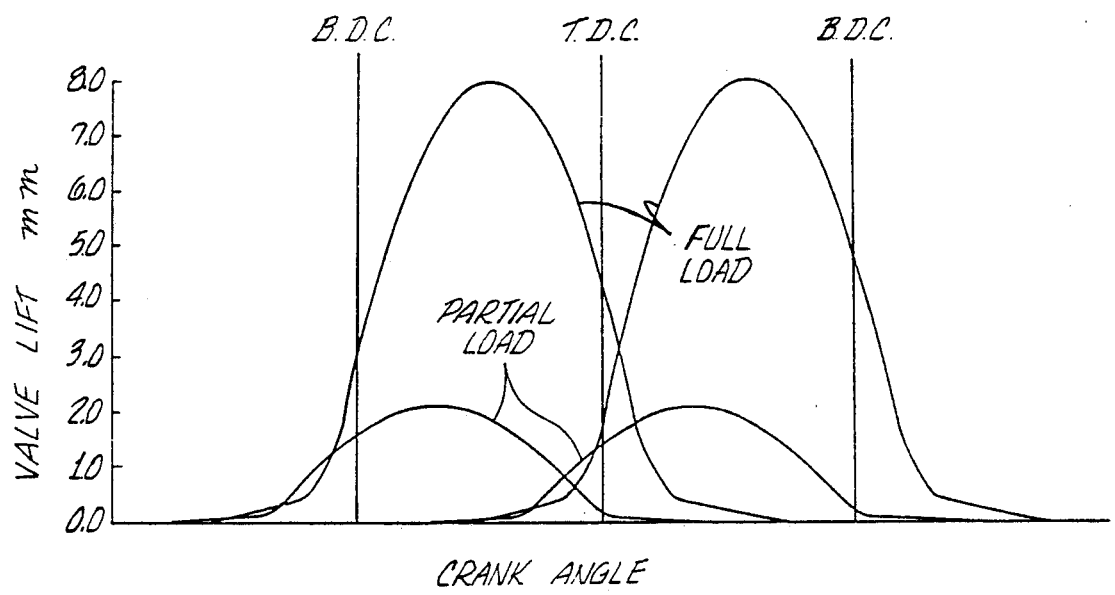
FIG. 6 is a graph showing valve characteristics.

During the partial load operation of the internal combustion engine 30, the worm gear shaft 102 is driven by the servomotor 104, actuating the intake camshaft support member 82 through the worm gear 106 and the sector gear 108. The exhaust camshaft support member 98 is actuated through the worm gear 110 and the sector gear 112. The camshaft support members 82 and 98 approach each other to the state illustrated in FIG. 5(a). Since the pair of worm gears 106 and 110 are formed as reverse screws, their thrust forces act to cancel each other, thereby reducing the load on the bearings of the worm gear shaft 102. When the intake cam 92 and the exhaust cam 92e come into contact with the forward portion of the slipper surfaces 72 and 72e of the rocker arms 62 and 64, a lever ratio from the rocker arm shafts 66 and 66e to the contact point between the cams 92 and 92e and the slipper surfaces 72 and 72e increases and, therefore, the rocking angle of the rocker arms 62 and 64 decreases. This results in the valve lift of the intake valves 46 and the exhaust valves 48 decreasing as shown in FIG. 6.

Figure 5B:
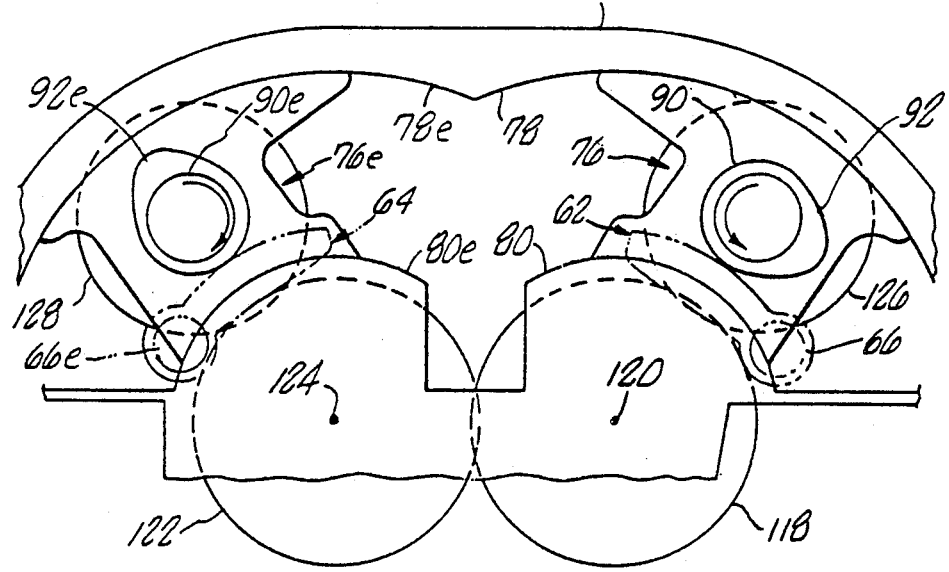

During the full load operation of the internal combustion engine 30, the camshaft support members 82 and 98 operate in the directions in which they move away from each other. When these members have reached the positions shown in FIG. 5(b) the cams 92 and 92e are in contact with the base end side of the slipper surfaces 72 and 72e of the rocker arms 62 and 64. In this state, the lever ratio from the rocker arm shafts 66 and 66e to the contact point of the cams 92 and 92e and the rocker arms 62 and 64 decreases. Therefore, the rocking angle of the rocker arms 62 and 64 increases and accordingly the valve lift of the intake valves 46 and the exhaust valves 48 increases as shown in FIG. 6, resulting in a larger increase in a valve overlap time area than in a partial load operation. At this time, as described above, it is possible to upwardly project the slipper surfaces 72 and 72e to a substantial extent by decreasing the curvature radii of the slipper surfaces 72 and 72e with the use of small size camshaft support members 82 and 98. Consequently, even when the cams 92 and 92e have moved close to the rocker arm shafts 66 and 66e during the full load operation shown in FIG. 5(b), both parts will not easily interfere with each other. This thereby results in a sufficient valve lift and increases the design freedom of the cams 92 and 92e as well.

Simultaneously with the aforementioned increase in the valve lift, the intake camshaft support member 82 rocks clockwise and accordingly the intake cam gear 126 which is meshed with the idler gear 118 slightly turns clockwise, i.e., in a reverse direction to the rotation of the camshaft 90, thereby shifting the phase angle of the intake cam 92 toward the delay side to cause a delay in the valve timing. Similarly, as the exhaust camshaft support member 98 rocks counterclockwise, the exhaust cam gear 128 meshed with the idler gear 122 also slightly turns counterclockwise, i.e., in the reverse direction of the rotation of the camshaft 90e. Thus, the phase angle of the exhaust cam 92e is shifted to delay and accordingly results in a delayed valve timing. That is, during the full load operation of the engine, the valves 46 and 48 are provided with a larger volume lift as compared with operation during partial load and accordingly operate with a controlled valve timing.

It is, therefore, possible not only to obtain the maximum inertia effect and improve volumetric efficiency by controlling the closing position of the intake valves 46 within a range after bottom dead center in the full load operation but also to change the valve overlap time area to effectively utilize the pulsation effect of the exhaust system by controlling the closing position of the exhaust valve 48, thereby enabling simultaneous realization of a high power internal combustion engine 30 and an improved flat torque.

In addition, during partial load operation, mechanical noise and friction occurring with valve operation can be reduced by decreasing the valve lift. Furthermore, with the decrease in the valve overlap time area caused by the decrease in the valve lift, the volume of passing fresh air decreases to enable the emission of relatively clean exhaust gases and also the reduction of exhaust pressure flowing back into the intake system, resulting in lowered intake air noise.

Since the intake camshaft support member 82 and the exhaust camshaft support member 98 are driven separately as described above, it is possible to perform a wider range of valve control by independently changing the valve lift and valve timing of the intake valves and exhaust valves by selecting the rocking angle and radius of the camshaft support members 82 and 98. Furthermore, since both the camshaft support members 82 and 98 can be made smaller in size, their layout and manufacture are easy to realize. This valve driving mechanism is also advantageous when applied to multiple cylinder internal combustion engines.

The foregoing has described in detail the first embodiment. However, other arrangements may equally apply to the present invention. The intake camshaft support member 82 and the exhaust camshaft support member 98 are driven commonly by the worm gear shaft 102 but may be driven separately. In this case, both the camshaft support members 82 and 98 are not necessarily required to rock in the same direction and a wider range of control can be accomplished by combining the direction of rocking of these members and the direction of arrangement of the rocker arms.

Looking next to the second embodiment as illustrated in FIGS. 7 through 13, a double overhead camshaft type four cylinder internal combustion engine 200 is provided with a cylinder head 202 mounted on the cylinder block 204 in which a piston 206 slides and a head cover 208 covers the upper part thereof. A combustion chamber 210 is formed beneath the cylinder head 202. Intake ports 21 and exhaust ports 214 extend through the cylinder head 202 which have positioned therein intake valves 216 and exhaust valves 218, respectively. The intake valves 216 and the exhaust valves 218 are biased toward closing by valve springs 220 and 222. In contact with the tips of these valves are tappet clearance adjusting screws 24 of intake valve rocker arms 226 and exhaust valve rocker arms 228. These rocker arms 226 and 228 are rockingly supported on an intake valve rocker arm shaft 230 and an exhaust valve rocker arm shaft 232, respectively. Both are axially supported on the cylinder head 202.

An idler gear 234 driven by a crankshaft is supported on a ball bearing 236 mounted to a boss 238 fixedly mounted by a bolt 240 on one side of the cylinder head 202. This idler gear 234 is in mesh with an intake cam gear 242 secured on an intake camshaft 244 and an exhaust cam gear 246 secured on an exhaust camshaft 248. On opposite surfaces of a pair of right and left guide members 250 and 252 and secured on the top surface of the cylinder head 202, guide grooves 254 and 256 are formed as circular arcs arranged coaxially with the center of rotation of the idler gear 234. In these guide grooves 254 and 256, a camshaft support member 258 is slidably mounted. The camshaft support member 258 includes two side plates 260 and 262 having two connecting members 264 connecting the side plates 260 and 262 at the upper part. The side plates 260 and 262 are formed nearly in the form of a circular arc. Guide groove 266 and 268 formed in the lower end of these side plates 260 and 262 are slidably engaged with the guide grooves 254 and 256 formed in the guide members 250 and 252.

The intake camshaft 244 and the exhaust camshaft 248 are rotatably installed between the side plates 260 and 262 of the camshaft support member 258. The idler gear 234 supported on the boss 238 is meshed with the intake cam gear 242 fixedly mounted on the intake camshaft 244 and the exhaust cam gear 246 fixedly mounted on the exhaust camshaft 248. An intake cam 270 provided on the intake camshaft 244 is in contact with a circular slipper surface 272 formed on the intake rocker arm 226 coaxially with the idler gear 234 while an exhaust cam 274 provided on the exhaust camshaft 248 is in contact with a circular slipper surface 276 formed also coaxially on the exhaust rocker arm 228. As can be seen from FIG. 7, both the rocker arm shafts 230 and 232 are provided on the same side (on the right-hand side in the same drawing) in relation to the camshafts 244 and 248. The camshafts 244 and 248 are driven in a counterclockwise direction.

In the upper part of the head cover 208, a worm gear shaft 278 is axially supported and driven by a servomotor such as a pulse motor. A worm gear 280 formed on the circumference of the worm gear shaft 278 is engaged with a sector gear 282 formed on one side plate 262 of the camshaft support member 258. Therefore, with the worm gear 280 driven by the servomotor 284, the camshaft support members 258 which support the two camshafts 280 are operated to slide along the guide members 250 and 252.

Figure 9:
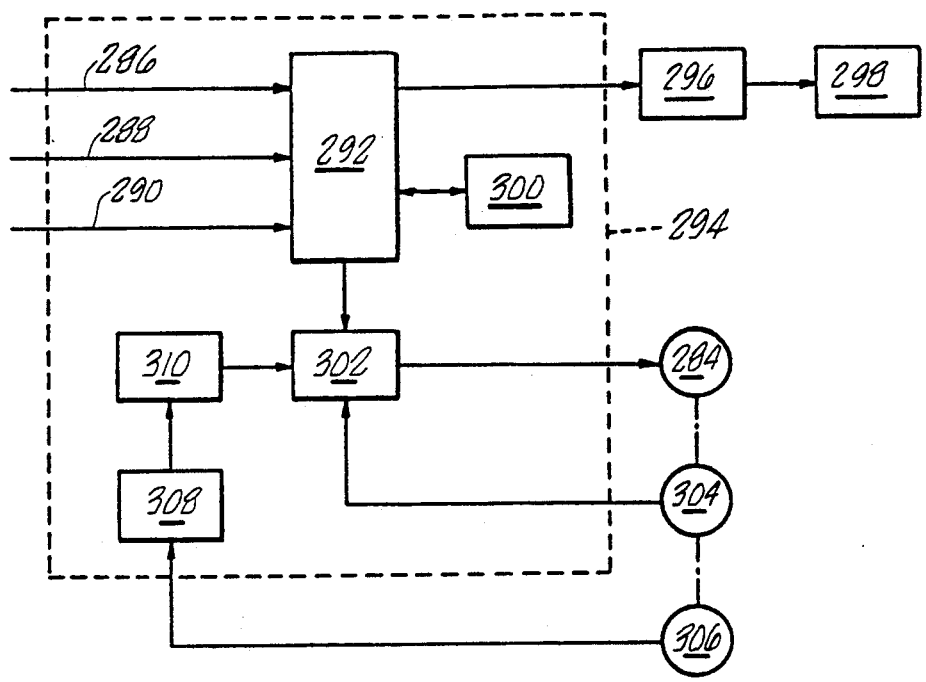
FIG. 9 is a schematic of a control mechanism for the mechanism of FIG. 7.

As shown in FIG. 9, an internal combustion engine speed signal 286, a crank angle signal 288 and a load signal 290 are inputted to a CPU 292 of an electronic control unit 294. The electronic control unit 294 controls an ignition unit 296 connected to an ignition coil 298 in accordance with the engine speed signal 286 and the crank angle signal 288. A memory unit 300 of this electronic control unit 294 stores a map which provides for a relationship between the load of the internal combustion engine and the phase of the camshaft support member 258. This map and the load signal 290 are processed by the CPU 292 to drive the servomotor 294. The servomotor 294 is driven by a motor drive unit 302 which is connected with the CPU 292 and is provided with a speed sensor 304 and a pulse generator 306. A speed signal from the engine speed sensor 304 and a feedback pulse indicative of camshaft phase from the pulse generator 306 are processed at a pulse processor 308 and a signal processor 310. The processed signal is fed back into the motor drive unit 302 to control the servomotor 284.

In this second embodiment, the rotation of the idler gear 234, driven by the crankshaft, is transmitted to the camshafts 244 and 248 through a pair of cam gears 242 and 246. Therefore, the camshafts 244 and 248 are driven at half speed from the crankshaft. The rocker arms 226 and 228 are in contact with the cams 270 and 274 which rotate with the camshafts 244 and 248. The operation of the cams 270 and 274 results in the rocker arms 226 and 228 pivoting about the rocker arm shafts 230 and 232. The intake valve 216 and the exhaust valve 218 are pushed by the rocker arms 226 and 228 to open at a rate of once per two turns of the crankshaft.

Figure 7:
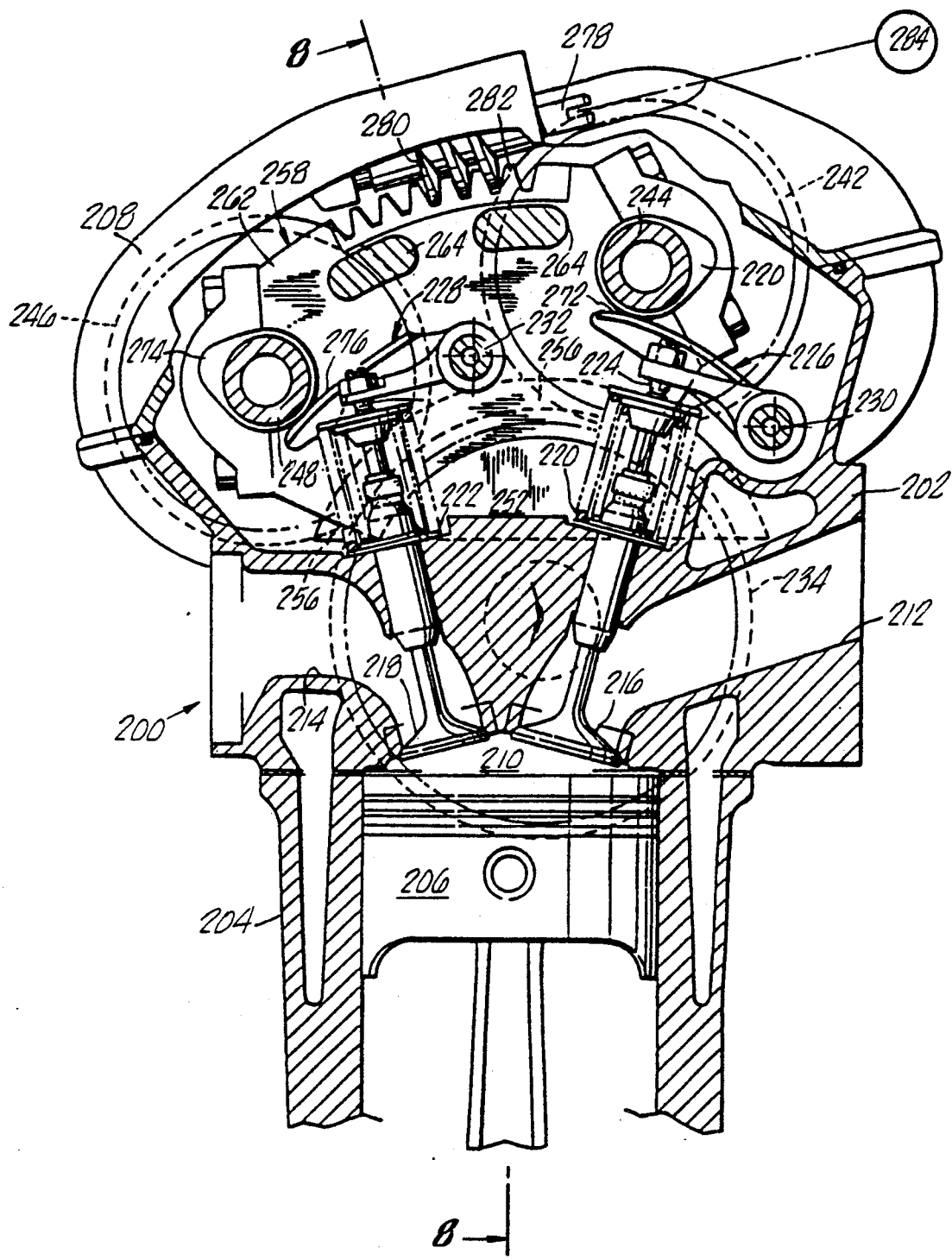
FIG. 7 is a sectional end view of a valve driving mechanism of a second embodiment.
Figure 8:
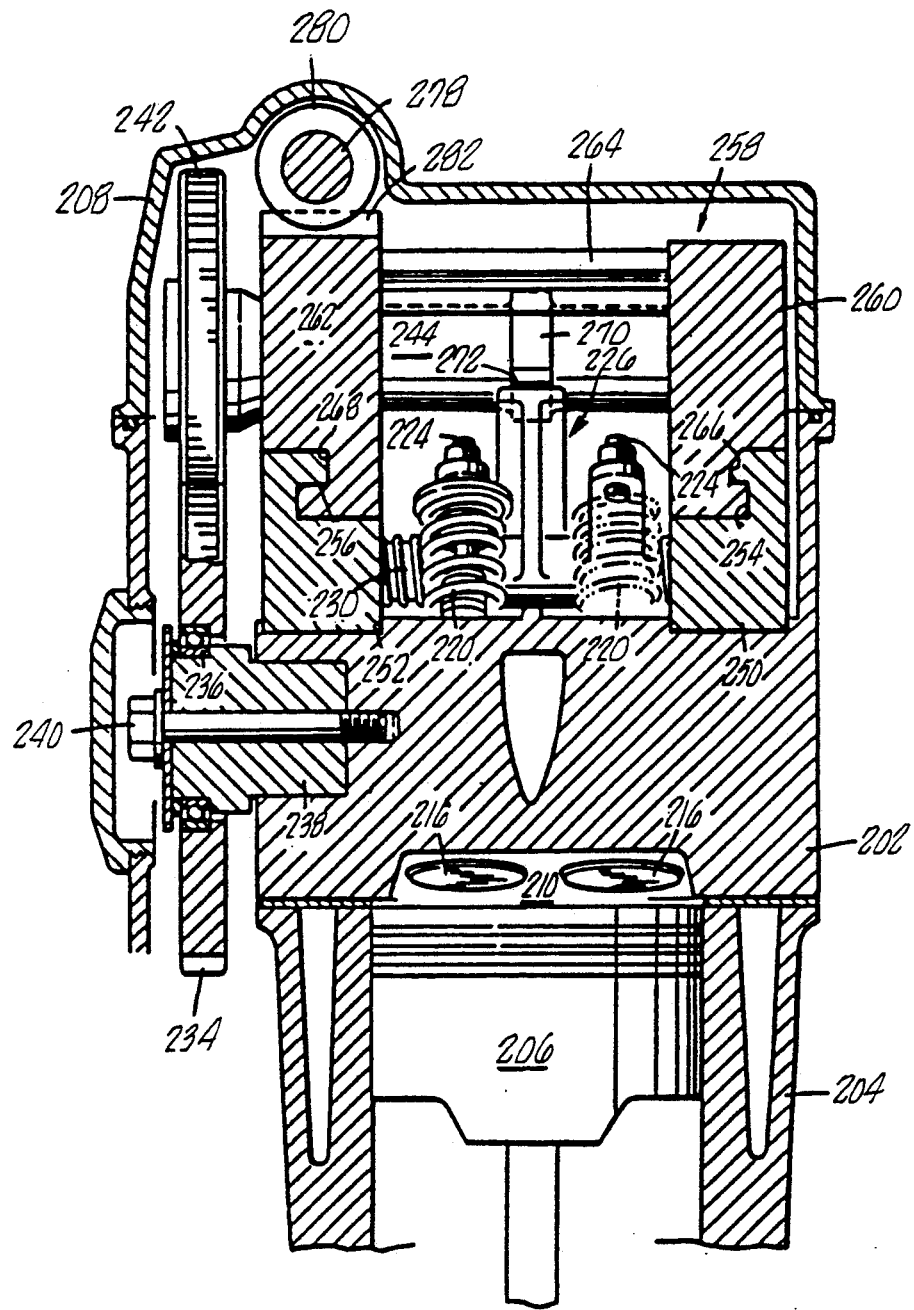
FIG. 8 is a sectional view taken along line 8—8 of FIG. 7.
Figure 10A:
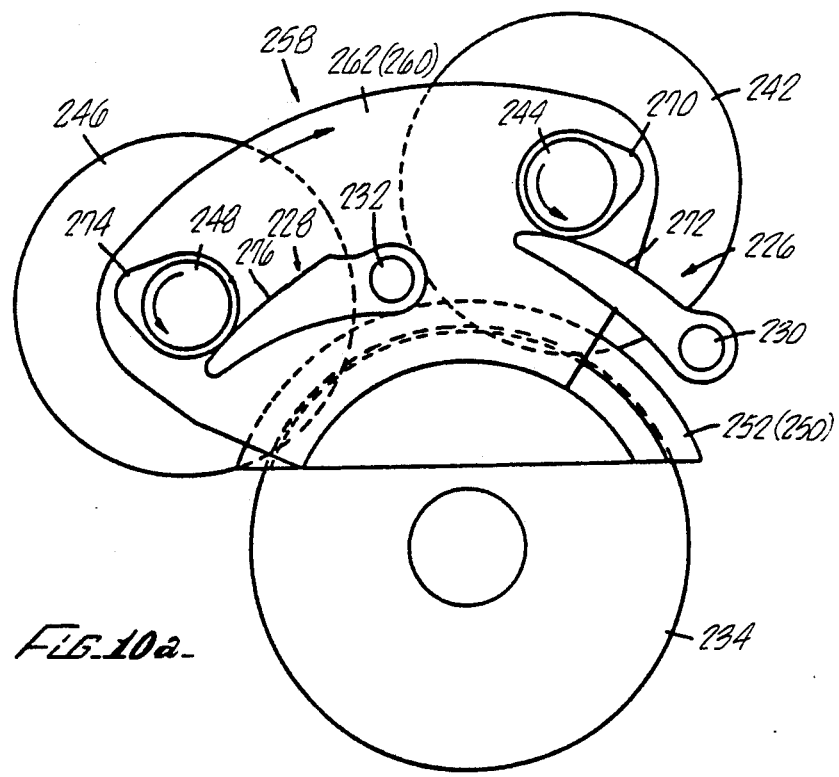
FIGS. 10a and b are explanatory views of operation in schematic form.
Figure 10B:
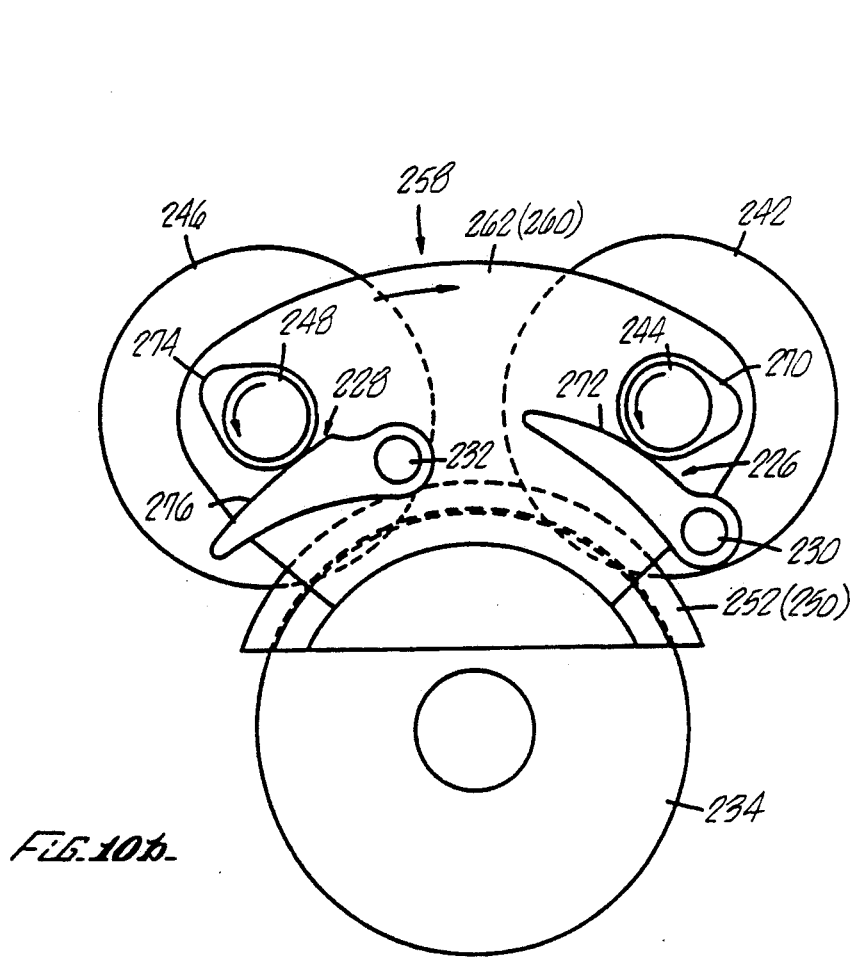

The intake cam 270 and the exhaust cam 274 turn counterclockwise as viewed in FIG. 7. As the phase angle of the exhaust cam 224 is advanced about 90° before the phase angle of the intake cam 270, the valve timing of the exhaust valve 218 advances before that of the intake valve 216. The valve timing of the exhaust valve 218 slightly overlaps that of the intake valve 216 to give an overlap timing between the exhaust valve 218 and the intake valve 216. When a small load signal is input to the electronic control unit, as shown in FIG. 10(a), which is during partial load operation of the internal combustion engine 200, the servomotor 284 operates to turn the worm gear shaft 278 which in turn moves the camshaft support member 258. The camshaft support member is guided by the guide members 250 and 252 to move in the counterclockwise direction by means of the worm gear 280 and the sector gear 282. Both of the cams 270 and 274, therefore, are in contact with the forward side (left side in FIG. 10) of the rocker arms 226 and 228. In this state, the rocking angle of the rocking arms 226 and 228 decreases because there exists a large distance between the rocker arm shafts 230 and 232 and the contact point between the cams 270 and 274 and the rocker arms 226 and 228. This decrease results in a decreased valve lift for either of the intake valve 216 or the exhaust valve 218 as is indicated by the full line in the graph of FIG. 11.

During the full load operation of the internal combustion engine 200, the load signal increases to operate the servomotor 284. The camshaft support member 258 is guided by the guide members 250 and 252 in a clockwise direction to the extent shown in FIG. 10. Therefore, the intake camshaft 244 and the exhaust camshaft 248 which are supported on the camshaft support member 258 are operated to rock as an integral part. The contact points between the cams 270 and 274 and the rocker arms 226 and 228 move toward the rocker arm shafts 230 and 232 to increase the rocking angle of the rocker arms 226 and 228 which in turn increases the valve lift of the intake valve 216 and the exhaust valve 218 as indicated by the broken lines in FIG. 11. Additionally, the valve overlap time area also increases as compared with the partial load operation. With the clockwise rocking of the camshaft support member 258, the intake cam gear 242 and the exhaust cam gear 246 turn in a reverse direction to the rotation of the camshafts 244 and 248. Therefore, the phase angle of the intake and exhaust cams 270 and 274 is delayed, resulting in a valve timing delay. That is, during the partial load operation, the valve lift is less than during the full load operation and an early valve timing is also achieved.

Figure 12:
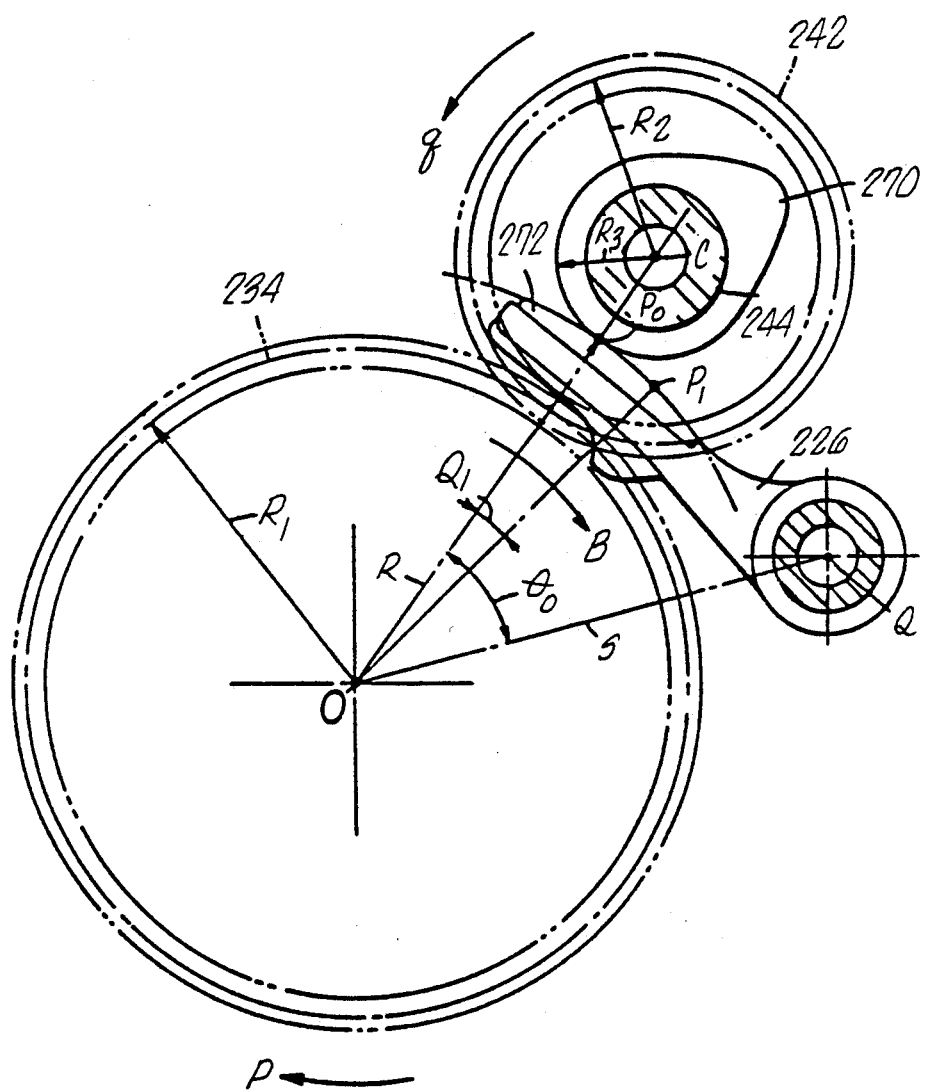
FIG. 12 is an explanatory schematic illustrating the principles of valve timing and valve lift change.

The principle that the valve timing and valve lift are changed by the rocking of the camshaft support member 258 will be explained in detail using the operation of the intake valve 216 as an example. In FIG. 12, represented are the idler gear 234, a cam gear 242, a camshaft 244, a cam 270, and a rocker arm 226. The center of the idler gear 234 is denoted at 312. The pitch circle radius of the idler gear 234 is $R_1$. The center of the cam gear 242 is C. The pitch circle radius of the cam gear 242 is $R_2$. The base circle radius of the camshaft 244 is $R_3$. The curvature radius R of the slipper surface 272 of the rocker arm 226 is calculated as $$R = R_1 + R_2 - R_3.$$

The support center of the rocker arm 226 is Q. A distance between the center 312 of the idler gear 234 and the support center Q of the rocker arm 226 is S.

During the partial load operation illustrated, the basic circle of the cam 270 is in contact with the slipper surface 272 of the rocker arm 226 at the point $P_0$, and, therefore, when the camshaft support member 258 is operated to rock outwardly (in the direction of the arrow B) in the full load operation, the base circle of the cam 270 comes in contact with the slipper surface 272 of the rocker arm 230 at the point $P_1$ of the cam 270. At this time, the directions of rotation of the idler gear 234 and the cam gear 242 are set in the directions of the arrows p and q, respectively. Therefore, when the camshaft support member 258 operates to rock outwardly to turn the cam gear 242 which is rotating on the idler gear in the reverse direction of the arrow q, the phase is delayed. That is, let Y be a change in the phase of the cam gear 242, then $$YR_2 = \Theta_1 R_1$$

and the phase of the cam gear 242, and in turn the cam 270, is delayed by $$Y = (R_1/R_2)\Theta_1.$$

Accordingly, the intake valve 216 is delayed.

Further, with the outward rocking (in the direction of the arrow B) of the camshaft support member 258, the base circle of the cam 270 and the contact point of the slipper surface 272 of the rocker arm 226 move to $P_1$. As a result, the lever ratio of the rocker arm 226 decreases from $QP_0$ to $QP_1$, thereby increasing the rocker angle of the rocker arm 226 and the valve lift of the intake valve 216. The ratio $\eta$ of the lever ratio is expressed by $$\eta = QP_1/QP_0.$$

Therefore, the application of the theorem of cosines as to the triangles $QOP_0$ and $QOP_1$ to the above equation gives $$\eta = \frac{\sqrt{S^2 + R^2 - 2SR\cos(\theta_0 - \theta_1)}}{S^2 + R^2 - 2SR\cos\theta_0}$$

From this it is understood that the ratio $\eta$ of the lever ratio decreases with the increase of $\theta_1$ (that is outward rocking of the camshaft support member 258).

Figure 11:
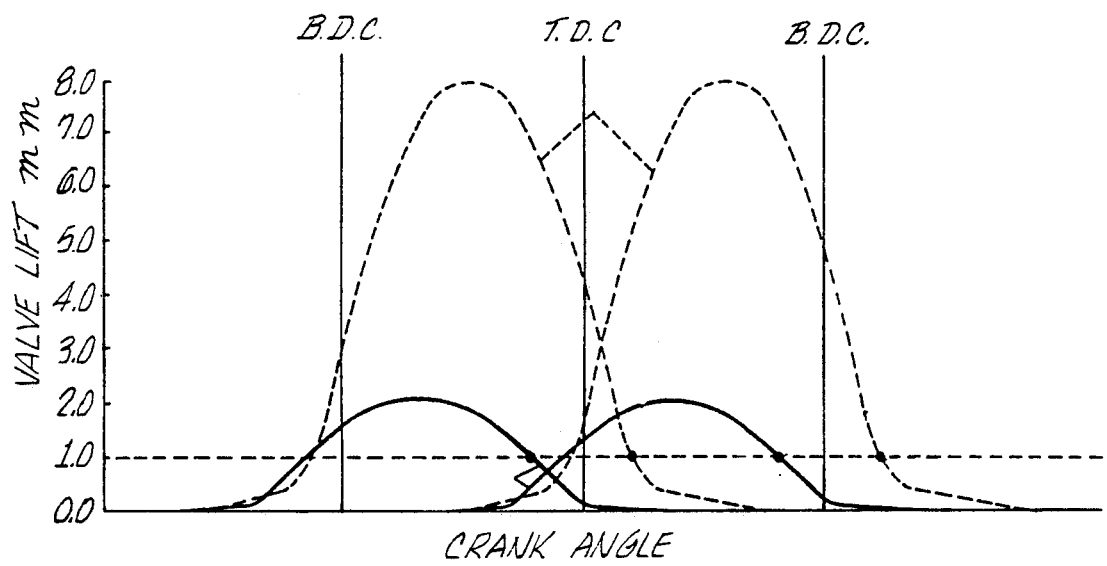
FIG. 11 is a graph showing valve characteristics for the embodiment of FIG. 7.

As is manifest from the above explanation, the valve timing of the intake valve 216 and the exhaust valve 218 is accelerated with the decrease of the valve lift of these valves during the partial load operation as seen in FIG. 11. With this change of the valve timing, the effective valve closing time of the intake valve 216 changes from after the bottom dead center in the full load operation to before the bottom dead center in the partial load operation. At the same time, the effective closing timing of the exhaust valve 218 also changes to before the top dead center in the partial load operation. During the partial load operation, therefore, the effective valve closing timing of the intake and exhaust valves is accelerated. This enables a decrease in the pumping loss in the partial load operation and, accordingly, improves the efficiency of the internal combustion engine 200. The effective valve closing timing of the intake valve 216 and the exhaust valve 218 is defined as a valve timing at the point of time when gasses substantially flow at about 1 mm valve lift of the valves 216 and 218, assuming that no significant gases flow until the valve lift reaches a prescribed amount.

Figure 13A:
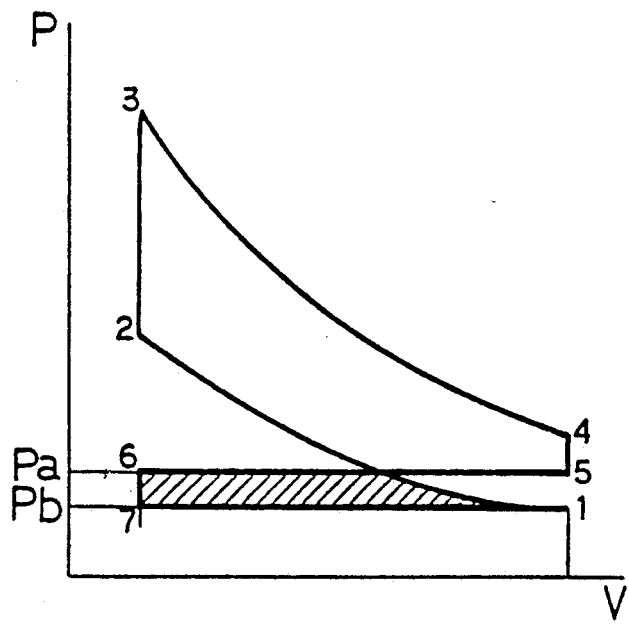
FIGS. 13a and b are pressure volume diagrams.

FIG. 13(a) is a view taken along line P-V of a conventional four cycle internal combustion engine in which the throttle valve is throttled during a partial load operation. This type of internal combustion engine is known as an Otto-cycle engine having the characteristic of $12345671$. This Otto-cycle engine has the following drawback. On the intake stroke ($7\Delta 1$) where the piston moves from the top dead center downward to the bottom dead center while drawing fresh air into the cylinder, the cylinder internal pressure $P_b$ becomes largely lower than the atmospheric pressure $P_a$ due to the presence of the passage resistance at the throttle valve. Therefore, the pumping loss indicated by the oblique lines increases. This results in poor fuel consumption and a lowered engine efficiency.

In the preferred embodiment, since it is possible to control the amount of fresh air drawn in on the intake stroke by advancing the valve closing timing of the intake valve 216 before bottom dead center in the partial load operation, the output torque of the internal combustion engine can be controlled even when the throttle valve is held in a wide-open position during the partial-load operation. Consequently, the passage resistance of fresh air flowing through the throttle valve in the partial load operation decreases and the cylinder internal pressure increases to $P_{b1}$ which is close to the atmospheric pressure $P_a$, with the result that the P-V characteristic thereof becomes a Miller cycle indicated by $1234567_181$. From this it is understood that the pumping loss indicated by the oblique lines largely decreases as compared with the Otto-cycle described above.

During the partial load operation, decreasing the valve lift can reduce mechanical noise accompanying the valve operation and exhaust noise from a lowering of blow-down pressure. Friction can also be decreased in the valve operation. Furthermore, since the valve overlap time area decreases with the decrease of valve lift, the amount of fresh air passing through the valve decreases, resulting in cleaner exhaust gases and a reduction of the exhaust pressure backflow into the intake system.

During full load operation, it is possible not only to obtain a maximum intake inertial effect and improve volumetric efficiency by controlling the intake valve closing position after bottom dead center but also to change the valve overlap time area to permit effective utilization of the pulsation effect of the exhaust system by controlling the exhaust valve closing position. This simultaneously results in a realization of high power and flat torque in the engine.

Figure 14:
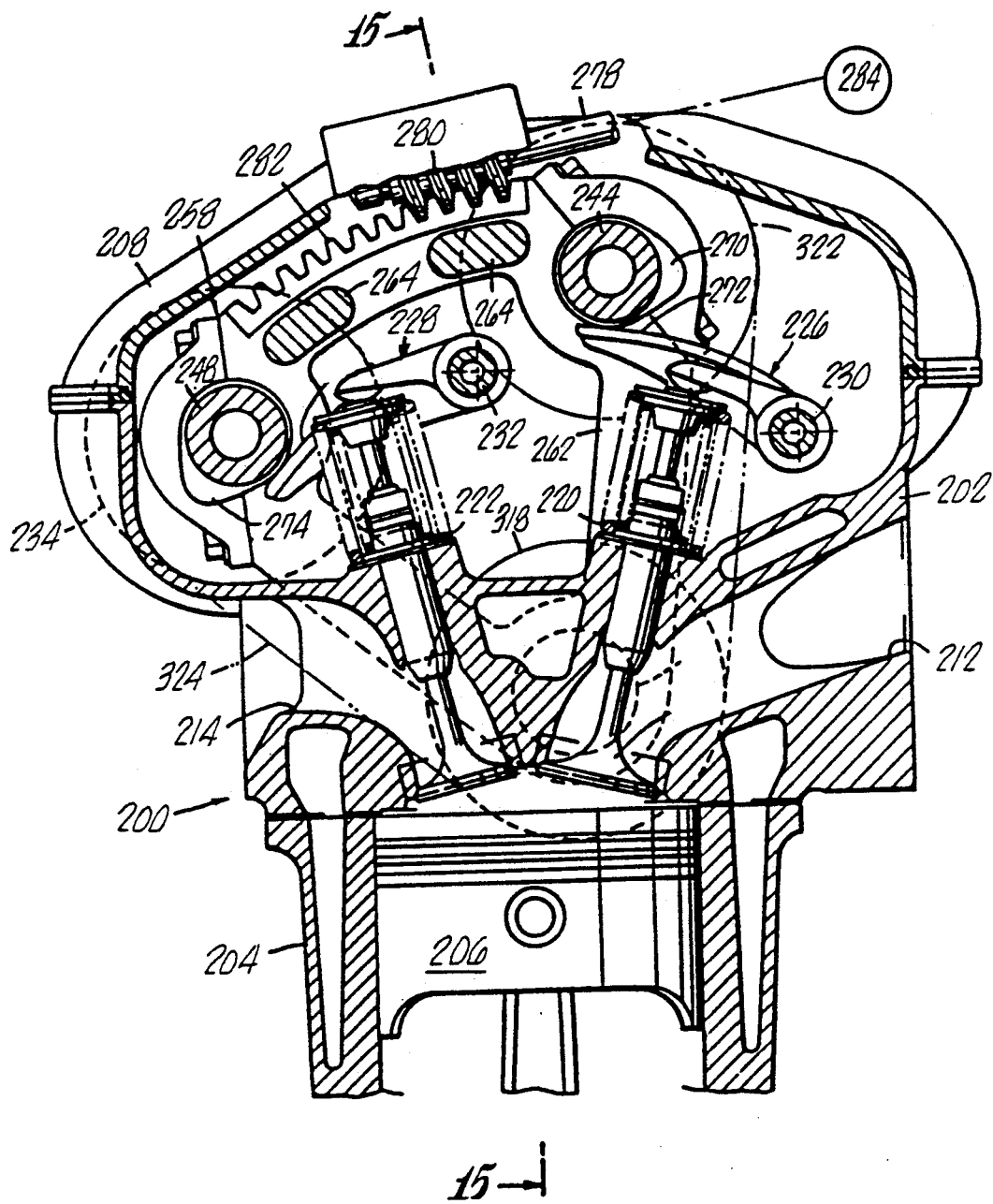
FIG. 14 is a cross sectional end view showing a third embodiment of the present invention.
Figure 15:
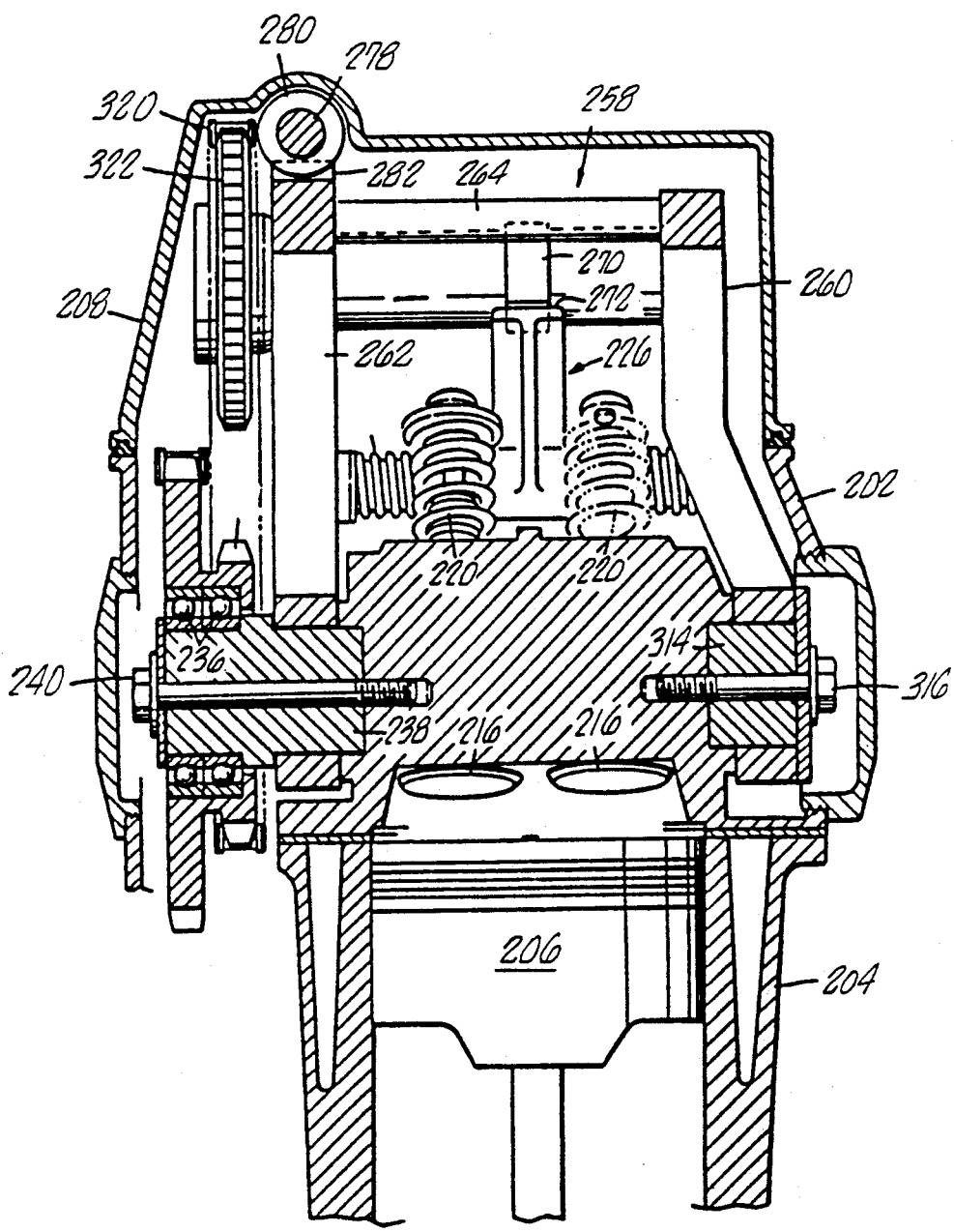
FIG. 15 is a sectional view taken along line 15—15 of FIG. 14.
Figure 16A:
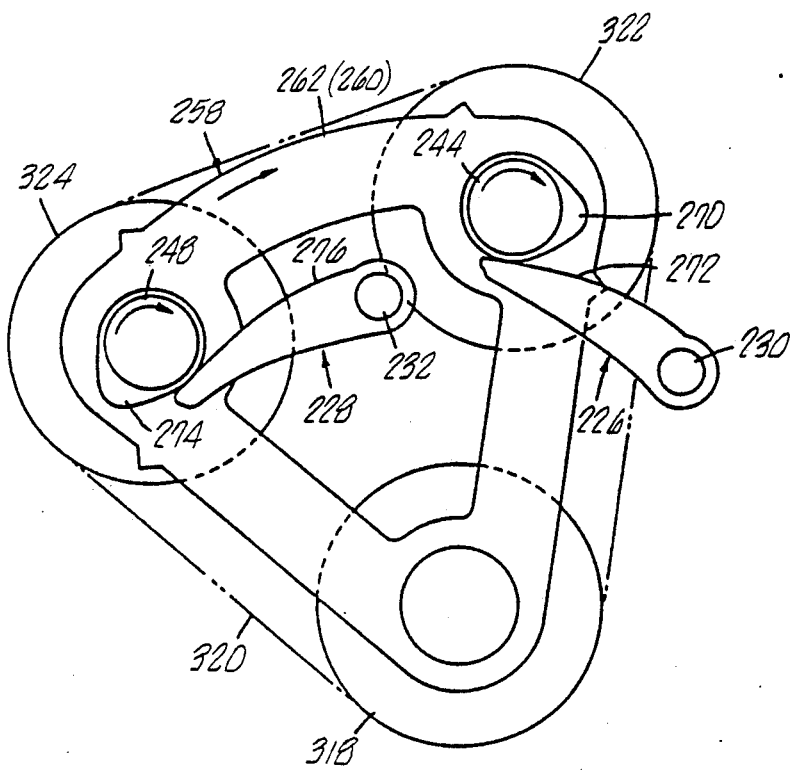
FIG. 16a and b are explanatory views of operation for the embodiment of FIG. 14.
Figure 16B:
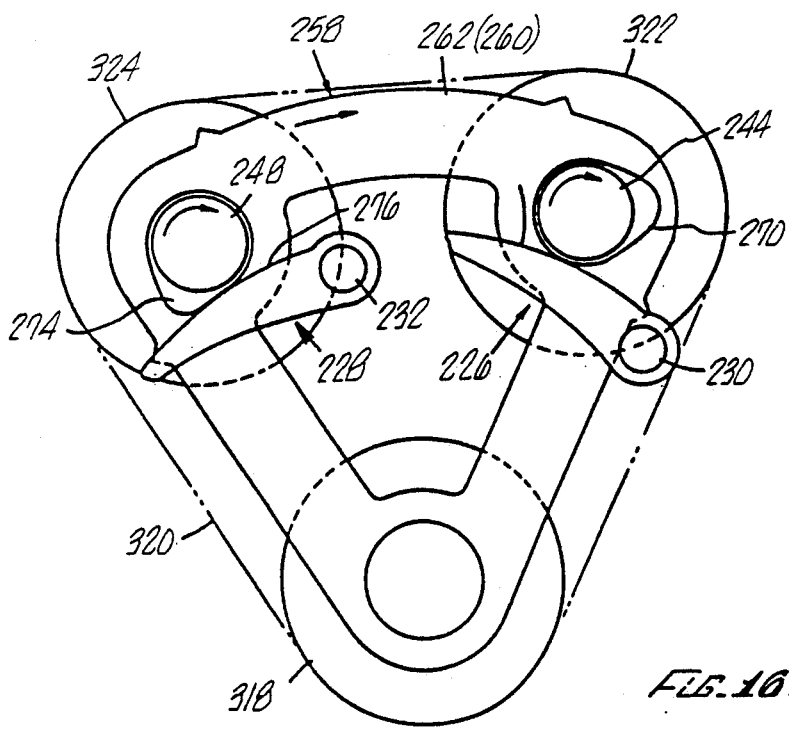
Figure 11:
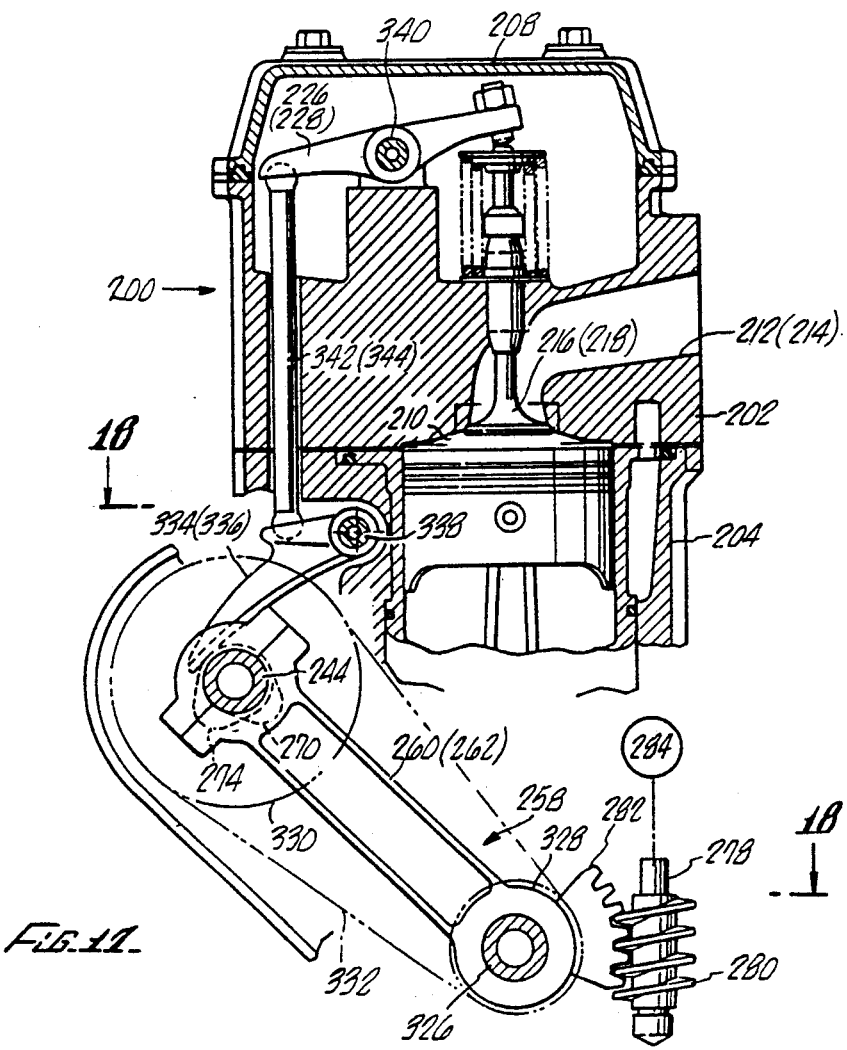

FIGS. 14 through 16 show a third embodiment of the present invention. Where appropriate, the same reference numerals have been used as those employed in the second embodiment.

In this third embodiment, the camshafts 244 and 248 re driven through a chain. Two bosses 238 and 314 are fixedly mounted by bolts 240 and 316 on the cylinder head 202. The cylinder head 202 pivotally supports a camshaft support member 258 shaped as a sector as viewed from the side. On the circumference of the two side plates 260 and 262, there are rotatably mounted an intake camshaft 244 and an exhaust camshaft 248. On one boss 238, an idler sprocket 318 is axially supported through a ball bearing 236. This idler sprocket 318 is connected through a timing chain 320 with cam sprockets 322 and 324 fixedly mounted on the camshafts 244 and 248. In the second embodiment, the camshafts 244 and 248 are set to rotate in the counterclockwise direction while in this embodiment the camshafts are set to rotate in the clockwise direction.

According to the present embodiment, when the camshaft support member 258 is operated to rock from the position (a) to the position (b) as seen in FIG. 16 by the worm gear 280 and the sector gear 282 with an increase in engine load, the contact point between the cams 270 and 274 and the rocker arms 226 and 228 approaches the rocker arm shafts 230 and 232, respectively, resulting in an increased valve lift of both the intake valve 216 and the exhaust valve 218. Also with the rocking of the camshaft support member 258, both the camshafts 244 and 24 slightly turn counterclockwise through the timing chain 320 (in the reverse direction of the rotation in the second embodiment). However, as the camshafts 244 and 248 are driven clockwise, the valve timing in the high load operation is retarded as in the previous embodiment as compared with that in the partial load operation. Thus, according to the present embodiment, a similar effect as aforementioned can be obtained. In addition, using the chain drive of the camshafts 244 and 248 enables the adoption of a compact camshaft driving mechanism. In this embodiment, a similar operational effect is obtained if a timing belt is employed in place of the chain for driving the camshafts.

Figure 18:
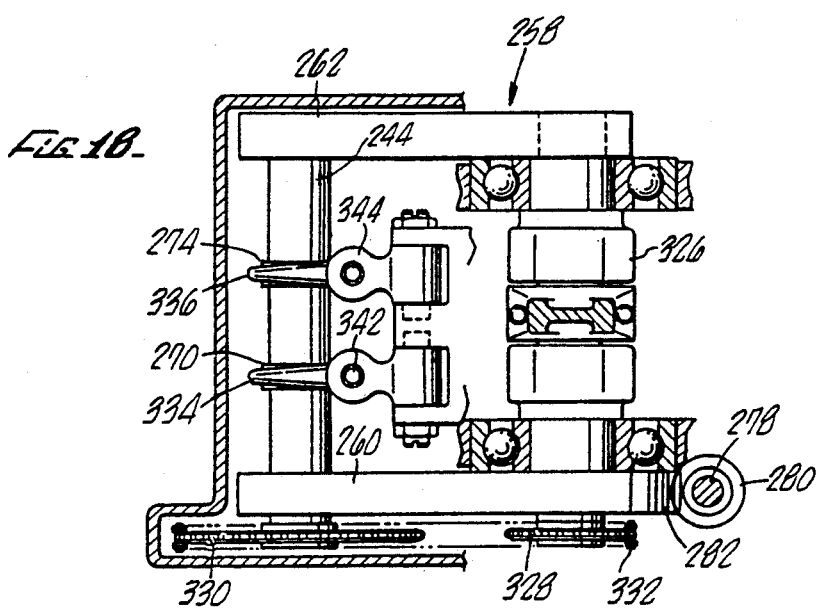
FIG. 18 is a sectional view taken along line 18—18 of FIG. 17.
Figure 19A:
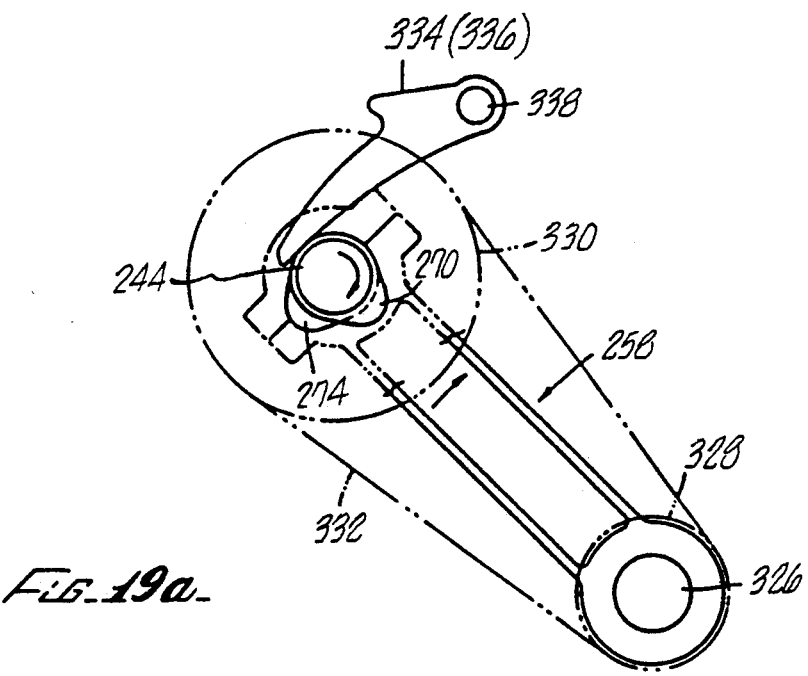
FIGS. 19a and b are explanatory views of operation of the device of FIG. 17.
Figure 19B:
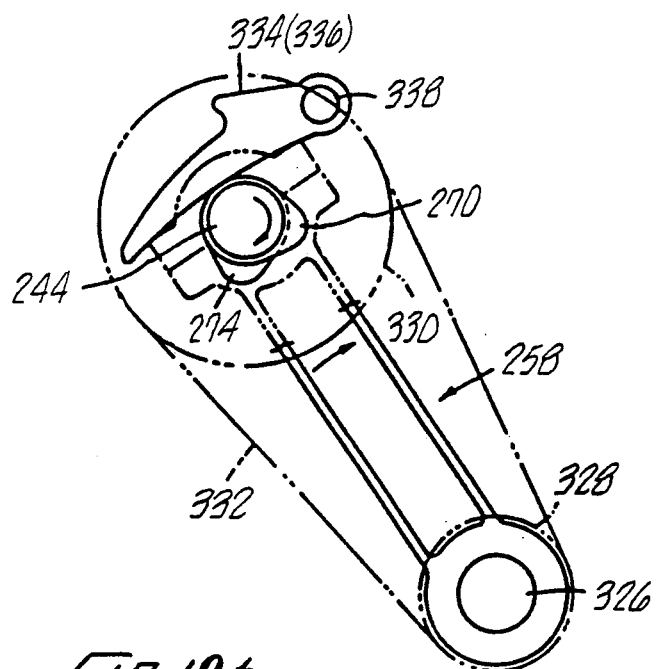

FIGS. 17 through 19 show a fourth embodiment of the present invention. Again, in this embodiment, the same reference numerals are used where appropriate.

In this fourth embodiment, the present invention is directed to a pushrod type valve driving mechanism. On the base and forward ends of the camshaft support member which is supported coaxially with the crankshaft 326, a small diameter driving sprocket 328 and a large diameter driven sprocket 330 are axially supported. These sprockets 328 and 330 are connected by a timing chain 332. On the camshaft 270 carrying the driven sprocket 330, intake cams 270 and exhaust cams 274 are fixedly mounted. These cams 270 and 274 are in contact with intake and exhaust cam followers 334 and 336 which are pivotally supported on an eccentric pivot shaft 338. The intake rocker arm 226 and exhaust rocker arm 228 supported in the upper part of the cylinder head 202 through one rocker arm shaft 340 are connected to the cam followers 334 and 336 through pushrods 342 and 344, respectively. With the rotation of the pivot shaft 338, a gap between the cam followers 334 and 336 and the camshaft 244 can be adjusted to a fixed value in any position of the crankshaft support member 258.

Also in this embodiment, when the camshaft support member 258 is operated to rock clockwise by the worm gear 106 and the sector gear 108, valve lift can be increased and valve timing can be retarded at the same time. With counterclockwise rotation of the camshaft support member 258, the valve lift is decreased and the valve timing advanced.

Figure 20:
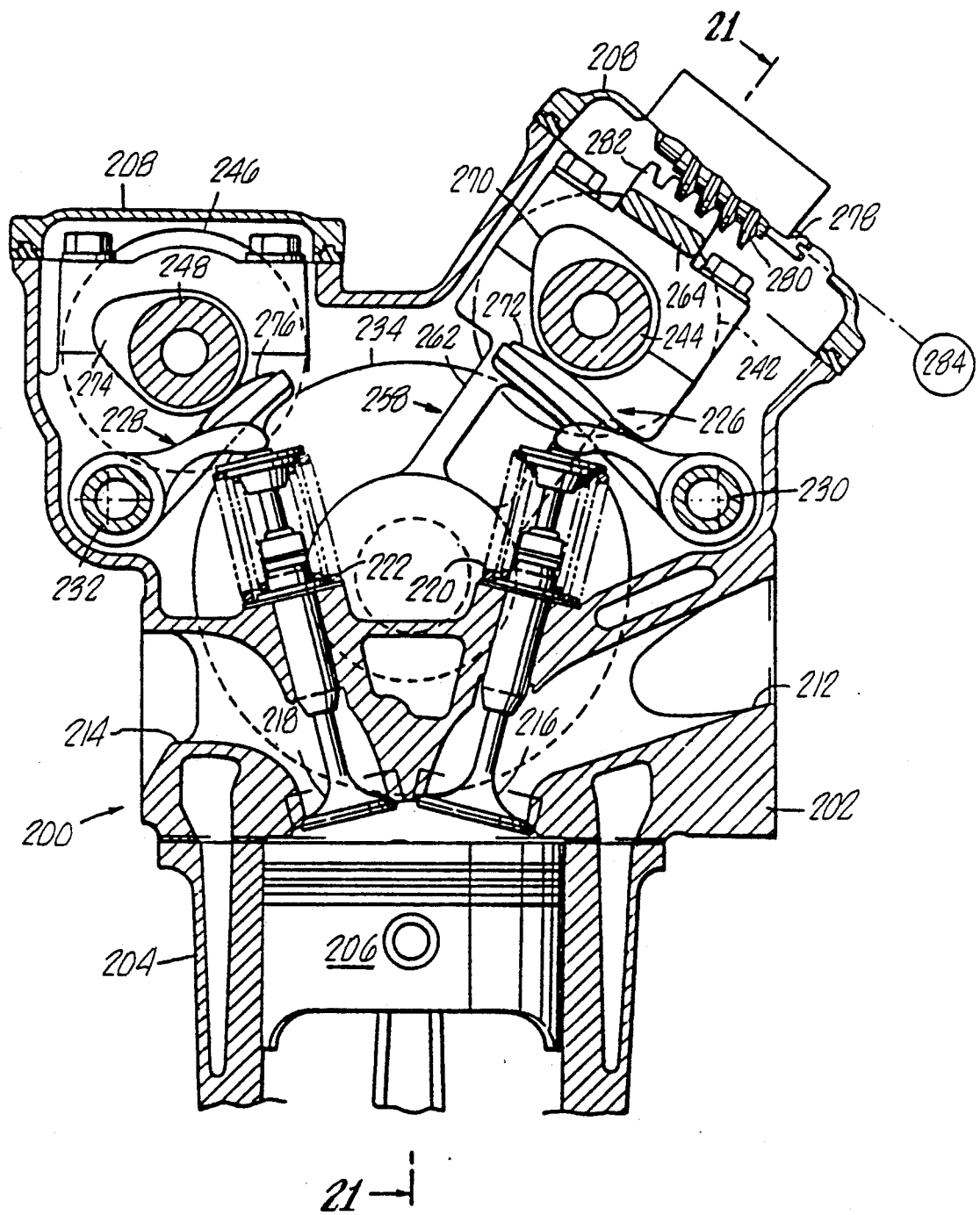
FIG. 20 is a sectional end view of a valve driving mechanism of a fifth embodiment.
Figure 21:
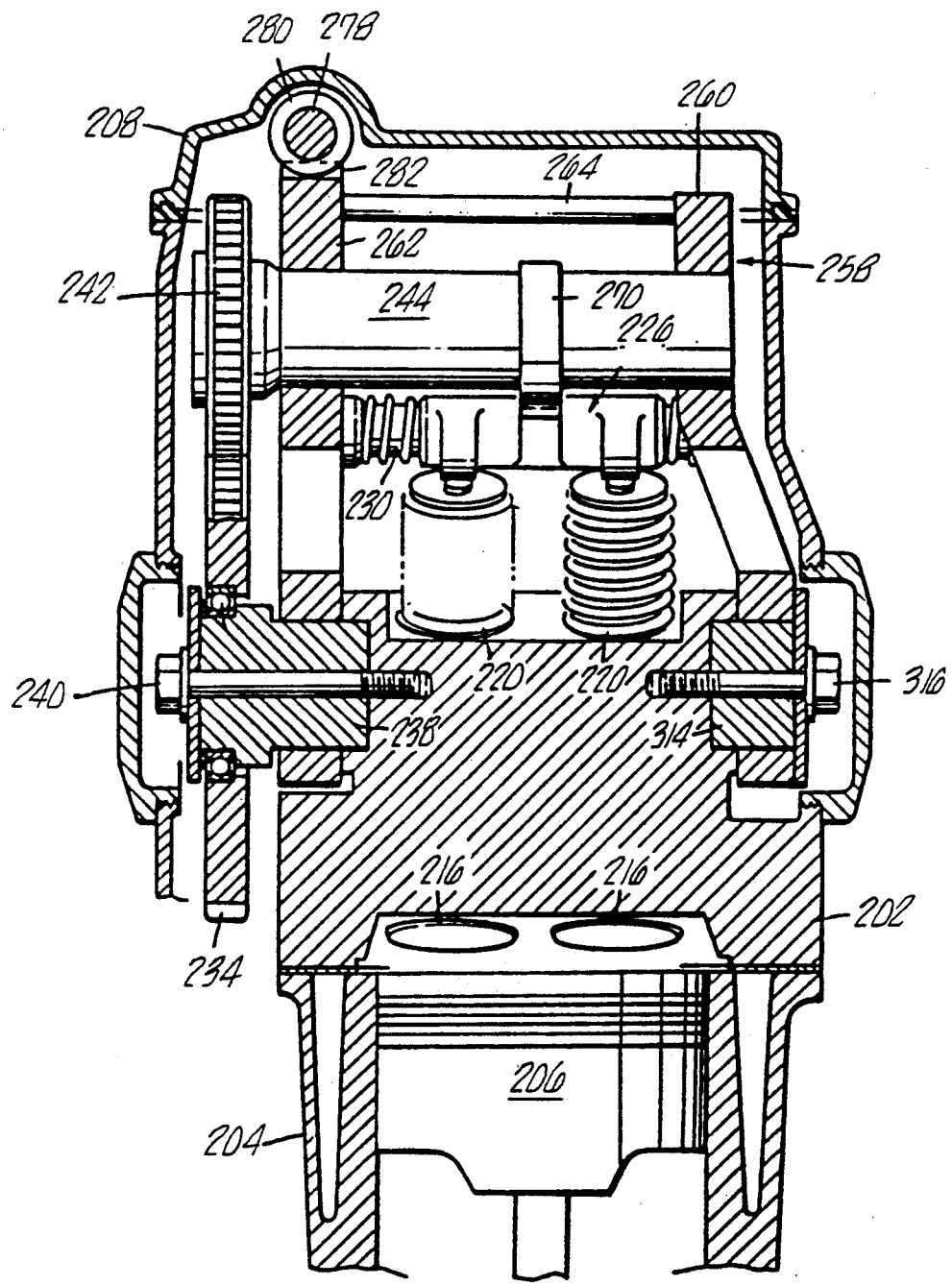
FIG. 21 is a sectional view taken along line 21—21 of FIG. 20.
Figure 22A:
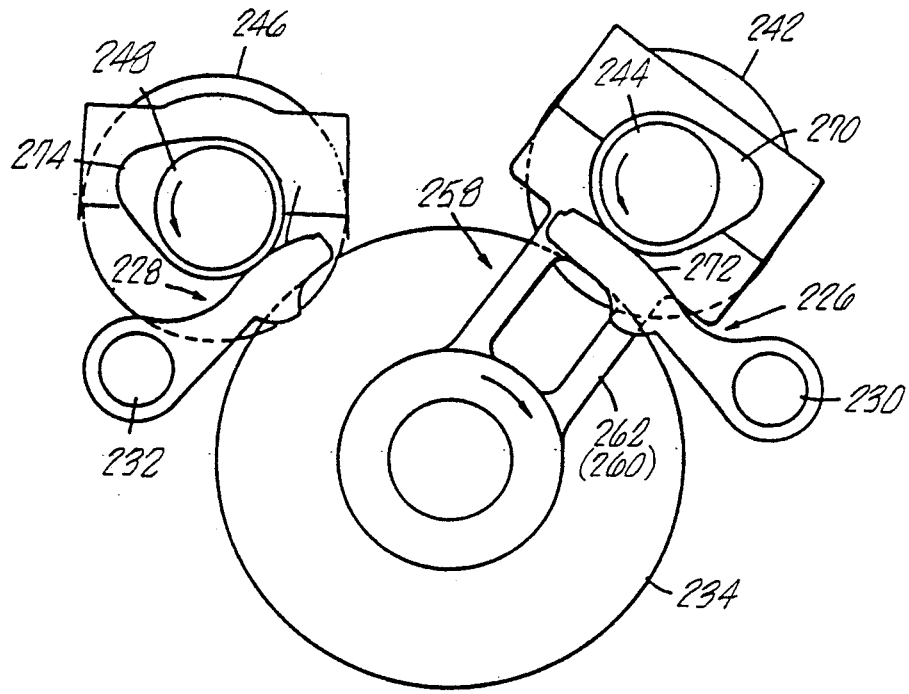
FIGS. 22a and b are explanatory views of operation of the embodiment of FIG. 20.
Figure 22B:
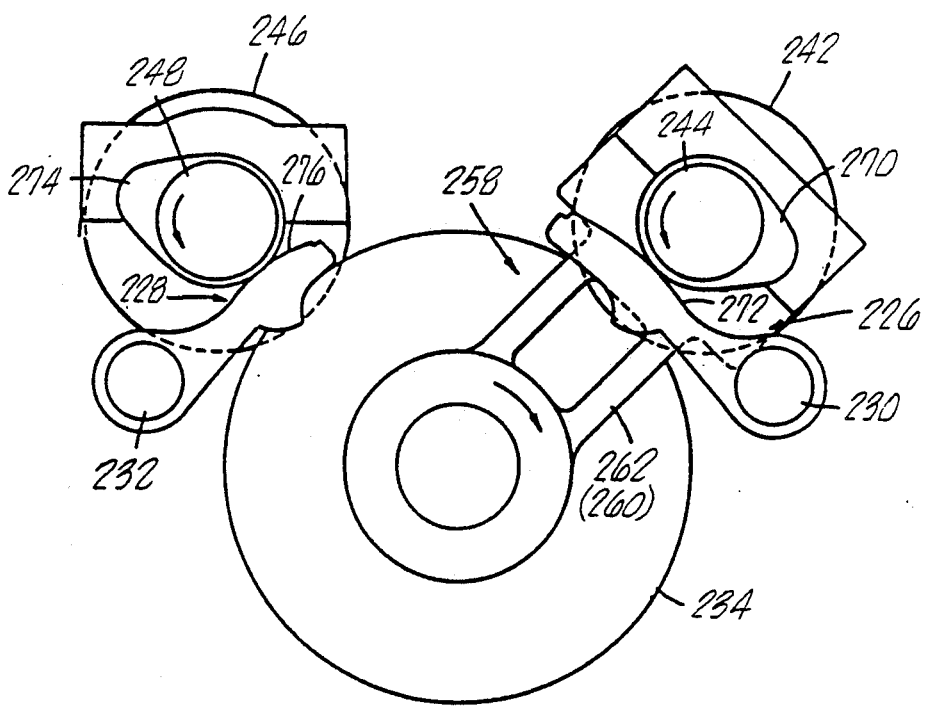

FIGS. 20 through 22 illustrate a fifth embodiment of the present invention. Again, where appropriate the same reference numerals are employed as with prior embodiments.

The fifth embodiment has the specific feature that the valve lift and valve timing of only the intake valve 216 are altered. The camshaft support member 258 supported on a pair of bosses 238 and 314 is formed in the shape of an arm extending in a radial direction. On the forward end thereof, the intake camshaft 244 is supported and carries the intake cam gear 242 and the intake cam 270.

Figure 13B:
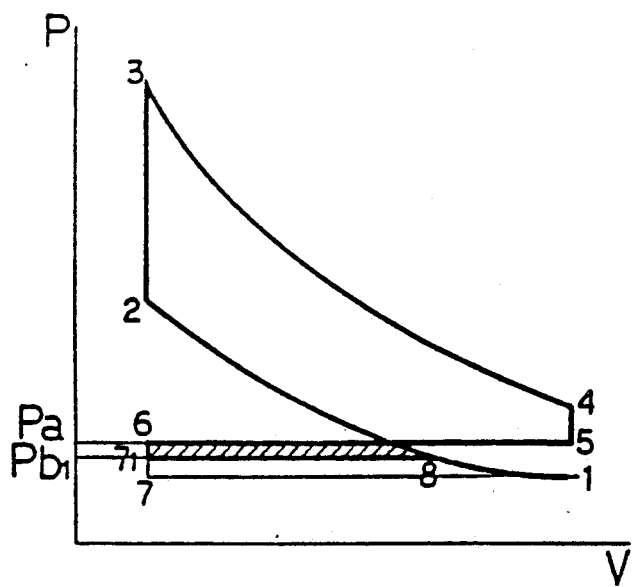

According to this embodiment, because it is possible to decrease the valve lift of the intake valve 216 and advance the valve timing during the partial load operation while maintaining the same valve lift and timing of the exhaust valve 218, a characteristic very close to the Miller cycle shown in the P-V diagram of FIG. 13(b) is realized.

While several embodiments have been presented, it may also be understood that the camshaft support member 258 is not necessarily required to be electrically driven but may be hydraulically driven. Furthermore, a valve clearance in low and high speed operation can be changed by shifting the center of curvature of the slipper surfaces 272 and 276 from the center of the idler gear 234 in place of forming the slipper surfaces 272 and 276 of the rocker arms 226 and 228 of a circular arc surface concentric with the idler gear 234. Additionally, it is not necessarily required to use two intake valves 216 and two exhaust valves 218. The number of these valves may be one each, or one intake or exhaust valve and two other valves. Furthermore, power transmission from the crankshaft to the idler gear 234 can be effected through any of gears, a chain and a timing belt.

Accordingly, improved valve driving systems have been disclosed which vary lift and timing of the valves of an internal combustion engine. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A valve driving mechanism for an internal combustion engine comprising
   an intake camshaft support member pivotally mounted to the engine to move about a first axis;
   an intake cam rotatably mounted in said intake camshaft support member about a second axis displaced from said first axis;
   an intake rocker arm pivotally mounted to the engine about a third axis displaced from said second axis to engage said intake cam;
   an exhaust camshaft support member pivotally mounted to the engine about a fourth axis;
   an exhaust cam rotatably mounted in said exhaust camshaft support member about a fifth axis displaced from said fourth axis;
   an exhaust rocker arm pivotally mounted to the engine about a sixth axis displaced from said fifth axis to engage said exhaust cam.

2. The valve driving mechanism of claim 1 wherein said intake rocker arm includes an intake slipper surface having a radius of curvature centered at said first axis and said exhaust rocker arm includes an exhaust slipper surface having a radius of curvature at said fourth axis.

3. The valve driving mechanism of claim 1 wherein there are multiple said intake rocker arms and multiple said exhaust rocker arms.

4. The valve driving mechanism of claim 1 further comprising a valve timing control operatively coupled with said intake camshaft support member to control pivotal movement thereof, said control effecting intake valve timing advance for intake valve closure before bottom dead center of said intake valve during partial load operation of the internal combustion engine.

5. The valve driving mechanism of claim 4 wherein said valve timing control is operatively coupled with said exhaust camshaft support member to control pivotal positioning thereof.

6. The valve driving mechanism of claim 1 further comprising
   a cylinder head having a first arcuate guide surface having a radius of curvature centered at said first axis and a second arcuate guide surface having a radius of curvature centered at said fourth axis;

a cylinder head cover having a first arcuate guide rail having a radius of curvature centered at said first axis and a second arcuate guide rail having a radius of curvature centered at said fourth axis, said intake camshaft support member being mounted to and between said first arcuate guide surface and said first arcuate guide rail and said exhaust camshaft support member being mounted to and between said second arcuate guide surface and said second arcuate guide rail.

* * * * *